United States Patent
Augustsson et al.

(10) Patent No.: US 10,527,079 B2
(45) Date of Patent: *Jan. 7, 2020

(54) LOCKING DEVICE AND METHOD FOR FIXATION OF COMPONENTS TO TUBES

(71) Applicant: FQ IP AB, Göteborg (SE)

(72) Inventors: Per Augustsson, Göteborg (SE); Per Elvèn, Örebro (SE)

(73) Assignee: FQ IP AB, Gothenborg (SE)

( * ) Notice: Subject to any disclaimer, the term of this patent is extended or adjusted under 35 U.S.C. 154(b) by 469 days.

This patent is subject to a terminal disclaimer.

(21) Appl. No.: 15/173,124

(22) Filed: Jun. 3, 2016

(65) Prior Publication Data

US 2016/0281754 A1    Sep. 29, 2016

Related U.S. Application Data

(63) Continuation of application No. 13/992,085, filed as application No. PCT/SE2011/051490 on Dec. 9, 2011, now Pat. No. 9,360,034.

(30) Foreign Application Priority Data

Dec. 9, 2010  (SE) ......................................  1001175
Jan. 28, 2011 (SE) ......................................  1100062

(51) Int. Cl.
*F16B 7/04*    (2006.01)
*F16B 7/18*    (2006.01)
*F16B 2/06*    (2006.01)

(52) U.S. Cl.
CPC .............. *F16B 7/0486* (2013.01); *F16B 2/06* (2013.01); *F16B 7/04* (2013.01); *F16B 7/185* (2013.01);

(Continued)

(58) Field of Classification Search
CPC ............. Y10T 403/345; Y10T 403/346; Y10T 403/44; Y10T 403/443; Y10T 403/34;

(Continued)

(56) References Cited

U.S. PATENT DOCUMENTS 2,018,539 A   10/1935   Paul
2,101,317 A   12/1937   Lemieux (Continued)

FOREIGN PATENT DOCUMENTS

DE    2348239         4/1974
FR    2671385 A1      7/1992

(Continued)

OTHER PUBLICATIONS

International Search Report from Application No. PCT/SE2011/051490 dated Mar. 13, 2012.

(Continued)

*Primary Examiner* — Matthew R McMahon
(74) *Attorney, Agent, or Firm* — Haug Partners LLP

(57) ABSTRACT

The invention relates to a locking device designed to lock objects to tubes or other elongated elements. The locking device generally comprises one or more lock plates and lock housings. In one exemplary embodiment, when assembling the locking device to a tube, two lock housings are put together with open sides against each other around a tube with a dimension corresponding to approximately half of a recess which is found on the lock housing's sides and are oriented in the tube's axial direction. The two lock housings form a closed geometry around the tube. Lock plates are used to connect the two lock housings together. By applying a screw in a threaded hole in one of the lock housings' cover, the through tube is pressed against an opposite lock housing at substantially the same time as the lock plates hold the lock housings together.

10 Claims, 11 Drawing Sheets

(52) U.S. Cl.
CPC ........... *F16B 7/0493* (2013.01); *Y10T 403/34* (2015.01); *Y10T 403/44* (2015.01); *Y10T 403/443* (2015.01)

(58) Field of Classification Search
CPC .. Y10T 403/341; Y10T 403/7105; F16B 7/04; F16B 7/048; F16B 7/0486; F16B 7/0493; F16B 7/185
See application file for complete search history.

(56) References Cited

U.S. PATENT DOCUMENTS

| | | | |
|---|---|---|---|
| 2,970,798 A | 2/1961 | Friotchle | |
| 3,096,110 A | 7/1963 | Cantor | |
| 3,606,407 A * | 9/1971 | Pendergast | F16D 1/04 15/179 |
| 3,834,549 A | 9/1974 | Burg | |
| 3,860,351 A | 1/1975 | Weiss et al. | |
| 4,175,405 A * | 11/1979 | Smith | F16D 1/033 403/341 |
| 4,289,417 A | 9/1981 | Mandell | |
| 4,338,040 A | 7/1982 | Hawkins | |
| 4,348,129 A * | 9/1982 | Conforti | F16B 12/28 403/218 |
| 4,597,690 A | 7/1986 | Girard | |
| 4,619,545 A | 10/1986 | Kuttenbaum | |
| 4,677,805 A * | 7/1987 | Schleisner | E04B 1/1903 403/170 |
| 5,181,747 A * | 1/1993 | Jovero | B29C 65/5042 156/403 |
| 5,328,290 A | 7/1994 | Plastina | |
| 5,492,294 A | 2/1996 | Haeussler | |
| 5,549,408 A | 8/1996 | Lo | |
| 5,715,633 A | 2/1998 | Raz et al. | |
| 5,785,447 A * | 7/1998 | Fonti | E04H 17/1413 403/49 |
| 6,128,876 A | 10/2000 | Nitschke et al. | |
| 6,273,633 B1 * | 8/2001 | Husson | A47B 47/0016 403/171 |
| 6,554,235 B1 * | 4/2003 | Fortier | A47B 57/565 248/122.1 |
| 6,575,652 B2 | 6/2003 | Krauss | |
| 7,021,590 B2 | 4/2006 | Hoffmann | |
| 7,090,427 B2 | 8/2006 | Petratto | |
| 7,618,417 B2 * | 11/2009 | Thomke | A61B 17/6466 403/329 |
| 7,621,099 B2 * | 11/2009 | Simmons | B23K 31/12 52/745.17 |
| 7,677,010 B2 * | 3/2010 | Boots | A47B 47/021 403/169 |
| 7,850,140 B2 * | 12/2010 | Jacobs | E02B 3/068 248/226.11 |
| 8,998,961 B1 | 4/2015 | Ziemek | |
| 9,267,624 B2 * | 2/2016 | Railsback | F16L 3/2235 |
| 2006/0038094 A1 * | 2/2006 | Simmons | A47F 5/14 248/188 |
| 2006/0115321 A1 * | 6/2006 | Maffeis | E04B 1/585 403/253 |
| 2008/0175660 A1 * | 7/2008 | Yang | F16B 7/0486 403/398 |
| 2008/0226389 A1 | 9/2008 | Zaguroli | |
| 2009/0249591 A1 * | 10/2009 | Melic | E04G 7/14 24/517 |

FOREIGN PATENT DOCUMENTS

| | | |
|---|---|---|
| WO | 8903461 | 4/1989 |
| WO | 9719618 | 6/1997 |

OTHER PUBLICATIONS

Written Opinion of the International Searching Authority from Application No. PCT/SE2011/051490 dated Mar. 13, 2012.
Euro-Bearings Ltd., "Combined Roller Bearings & Mating Steel Profiles", Mar. 1, 2009, pp. 1-24, https://web.archive.org/web/20101122183022if_/http://euro-bearings.com/crbearings/pdf.
Supplementary European Search Report dated Sep. 25, 2017.

* cited by examiner

US 10,527,079 B2

LOCKING DEVICE AND METHOD FOR FIXATION OF COMPONENTS TO TUBES

CROSS-REFERENCE TO RELATED APPLICATIONS

This application is a continuation of U.S. application Ser. No. 13/992,085, filed Jul. 25, 2013, which is the U.S. national phase entry of PCT/SE2011/051490, with an international filing date of 9 Dec. 2011, which claims the benefit of Swedish patent application no. 1001175-7, with a filing date of 9 Dec. 2010 and Swedish patent application no. 1100062-7, with a filing date of 28 Jan. 2011, the entire disclosures of which are fully incorporated herein by reference.

TECHNICAL AREA

The present invention relates to technology for fixing and mounting accessories to tubes with different cross-sections and dimensions and to technology for transportation of goods, packaging, material etc. in e.g. warehouses and at assembly stations, by means of gravity.

BACKGROUND

Locking devices for tube constructions are used in many different applications, e.g. for connecting tubes in material racks, tent racks, work platforms and stands but also to connect accessories to tubes.

Today's locking devices are not flexible enough to adjust to new conditions. Adjustment means adjustment of e.g. a tube rack's height, width and depth, and it can also be connection of new accessories. Accessories also include new tubes, or relocation of existing accessories on an assembled tubular construction. Most locking devices usually have a limited functionality, which results in that several different variants of locking devices must be purchased in order to build the desired tubular construction and to attach accessories thereto. When a tubular construction shall be rebuilt in order to be adjusted to new conditions, it is not certain that all locking devices can be reused. This results in increased costs and unnecessary waste.

Examples of tube racks which must be adapted in terms of width, length, height, and accessories are material racks used in the manufacturing industry. When new products are introduced and production starts or when production volumes changes, there is a need of rebuilding the material facade at a production line and at warehouses where production items are stored. I.e., the material racks along the production line or in the warehouse must be adjusted to store new types of packaging and to handle new buffer levels (number of packages). Product changes and volume changes occur with more frequent interval, and today's solutions for how material racks are constructed are not flexible enough to quickly, easily and cost effectively adapt to the new conditions.

Roller conveyors are used in many different applications for by means of gravity move objects from one position to another. In e.g. material racks, roller conveyors are used to transport packaging from the loading station to the consumption station.

When new products are introduced and will start production or when production volumes change, there is a need to rebuild the material facade at a production line and at warehouses where production items are stored. I.e., the material racks and other material handling systems along the production line or in the warehouse must be adjusted to store new types of packaging and to handle new buffer level (number of packages).

Product changes and volume changes occur with more frequent interval, and today's roller conveyors, which e.g. is s part of a material rack, are not flexible enough to quickly, easily and cost effectively adapt to the new conditions. Adjustment means the possibility to adjust the rolling conveyor's length and the ability to easily replace the wheels that are assembled in the roller conveyor in order for the roller conveyor to handle new types of packaging.

Today's roller conveyors consist of a steel profile in which a number of wheels with axles are fixed directly to the steel profile. The roller conveyors are sold and delivered in predefined standard lengths. This means that the roller conveyors must be cut to the right length at the end user to fit the desired application. When the user wants to rebuild e.g. a material rack, for example by making it deeper, it means that the roller conveyors must be extended and then new roller conveyors with the correct length must be purchased.

If the user would like to reduce the depth, the roller conveyors must be cut to the correct length, which often results in waste of the roller conveyors that are difficult to reuse.

When the wheels of the roller conveyor need to be replaced, e.g. switching from plastic wheels to steel wheels, wheel for wheel in the steel profile must be replaced, which takes a very long time, at the same time as it interrupts the production. This results in that the wheels are never changed, and in practice the user instead purchases a completely new roller conveyor where the new type of rollers are assembled from the beginning. This also results in waste of roller conveyors which are difficult to reuse in other applications.

SUMMARY

The present invention solves the problems of the known technology, by that a locking device, with the subsequent patent claims specified characteristics, can be used for several different locking functions. The locking device consists of lock plates and lock housings.

According to one embodiment, a lock housing is shaped like a shell, intended for use in a locking device for fixing to an elongated element. The lock housing includes a first side comprising at least three holes, wherein at least one hole comprises threads. The hole is positioned on the first side such that an axial extension of the hole's periphery cuts the elongated element when the locking device is fixed to the elongated element, such that a screw placed in the hole with a thread can be applied to the elongated element, and that the lock housing further comprises at least two other sides substantially perpendicular to the first side. The other sides comprise a recess intended to receive the elongated element.

The other sides, which are opposite to each other, have the same dimension and shape of the recesses in order for the elongated element to run through the lock housing. The other sides include holes or protrusions intended to be connected with corresponding holes or protrusions in a lock plate.

Furthermore, is here shown a lock plate intended for connecting with a lock housing for fixating to an elongated element. The lock plate comprises a hole located in the middle of the plate, allowing the elongated element to run freely through the hole, and at least two holes or protrusions intended to be fastened in holes or protrusions of a first and a second lock housing for connecting the first and second locking house.

According to one embodiment, a locking device is intended for fixation to an elongated element. The locking device includes two lock housings, according to an embodiment shown herein, and two lock plates, according to an embodiment shown herein. Two lock housings can be assembled to form a geometry, where the assembled geometry has through holes formed by the recesses in the lock housings, whereby the through holes correspond to the geometry of the elongated element the locking device is intended to be fastened to. Holes or protrusions on the lock housings form an interface comprising at least two holes or two protrusions, which interface is found on all sides of the locking device. A lock plate with protrusions or holes corresponding to the interface, can be assembled to two sides of the lock housings for connecting of the lock housings, at which the locking device is intended to be locked to the elongated element by a screw being applied in one of the threaded holes, of which the axial extension of the periphery cuts the elongated element, such that the elongated element is pressed against the opposite lock housing at the same time as it creates tensile forces in the lock plate such that contact pressure and/or friction between the screw and the longitudinal element, and between protrusions or the holes on the lock plate, and holes or protrusions in the lock housings holds the locking device together.

According to one embodiment the locking plates include protrusions with through holes with internal threads in order to connect accessories to the locking device.

According to an exemplifying embodiment, the lock housings are shaped as a shell with one open side and a cover which is opposite to the open side. On the cover, holes are placed in a pattern, and in addition to the holes that form a pattern, there are also threaded holes. These holes can be used to attach accessories to the cover or to lock the locking device. On the other sides, there are half the hole pattern that is found on the cover and also a recess corresponding to half of the cross section on the tube that the locking device can be locked to. The recesses are always identical on two opposite sides of the lock housing. This allows the tube to run straight through the lock housing.

The lock plate has a hole in the middle that allows the tube, that the locking device shall be connected to, to run freely through the hole. This ensures that the tube does not lean on the lock plate when assembling instead of against the lock housing's recess. The lock plate has pins that are placed in accordance with the same pattern as the holes on the lock housing's cover.

When assembling the locking device to a tube, two lock housings are assembled with the open sides against each other around a tube with the dimensions corresponding to the recesses that are oriented in the tube's axial direction. The two lock housings then form a closed geometry around the tube and all sides of the locking device has a hole pattern corresponding to the hole pattern on the lock housing's cover. Two lock plates can be assembled by fitting in the pins in the hole pattern so that half of a lock plate's pin are in each lock housing. By applying a screw in the threaded hole in the middle of one of the lock housing's cover, the through tube will be pressed against the opposite lock housing at the same time as the lock plates hold the lock housings together. The locking device is then locked by means of contact pressure and friction. As the same hole pattern is found on all sides, the assembling of components by means of the same interface on all of the locking device's sides is allowed.

To attach accessories to a tube by means of a locking device, the accessories can either be connected to a through hole with thread on the lock plate's pin or the interface with the pin can be integrated into the accessory.

It is also possible to use the invention in a corresponding way but to have the pins on the lock housing and the holes in the lock plate or to replace the screw that locks the device with any other type of clamping element.

The present invention also concerns a roller conveyor that solves the problems of the known technology by that the roller conveyor, with the subsequent patent claims specified characteristics, can be used for several different dimensions of racks and other material handling systems. The roller conveyor includes an inner and outer profile and roller organs, such as wheels, which are assembled to a connecting organ, such as for example rubber strip.

The roller conveyor includes an inner and an outer profile of which the inner profile can run freely in the outer profile, and thus creating a telescopic function.

According to one embodiment, the inner and outer profile is in the form of a c-profile where the width of the opening is equally wide on both the inner and outer profile. The opening side also includes recesses which are designed to receive the axle that the roller organs are assembled to. The distance between the recesses on the profile determines the distance between the roller organs in the roller conveyor.

According to one embodiment, the roller organs are assembled to an axle which is intended to be placed in the recesses on the inner and outer profiles. When the axle has been placed in the recess, the axle also locks the inner and outer profile to each other in its longitudinal direction.

According to one embodiment either end of the roller organ's axle is assembled to a connecting organ. The axles are assembled to the connecting organ with a distance equal to the distance between the recesses on the profiles in order for the roller organs to be assembled and disassembled in the entire profile's length simultaneously.

Note that the invention can be combined freely within the patent claims' scope.

BRIEF DESCRIPTION OF THE FIGURES

The invention is described in detail below by means of enclosed exemplifying embodiments with reference to the enclosed drawings in which.

DETAILED DESCRIPTION

Figure 1:
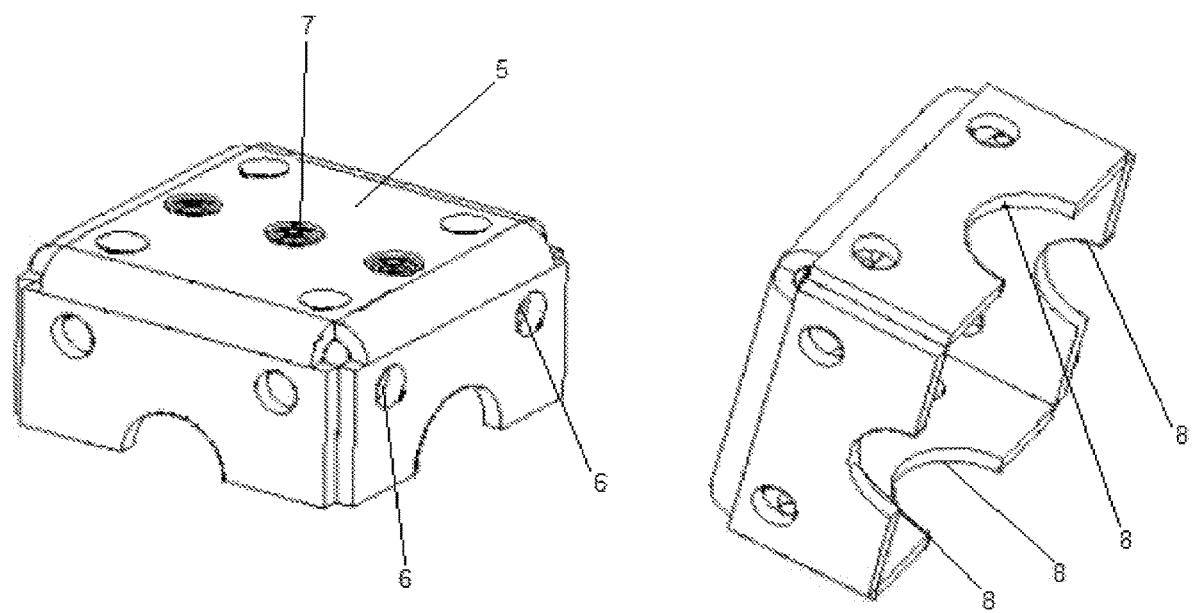
FIG. 1 shows a lock housing

In the following, a description of embodiments will be made in reference to the enclosed drawings. It should be noted that the figures are only for illustrating embodiments and shall not be considered to limit the scope of protection. Directional specifications shall be viewed only as directional specifications in the drawings.

By means of the invention, different variants of lock functions can be created by combining two different types of components with each other. The modular based design makes it very simple to do re-constructions/re-assemblies of e.g. a tubular rack or relocation of accessories on this tubular rack.

The invention includes two different components:
Lock housing
Lock plate

Two lock housings and two lock plates together create a locking device.

FIG. 1 shows a lock housing according to one embodiment, wherein the lock housing is a component shaped as a shell with an open side and a closed side in the form of a cover 5. On the cover there is an interface with a hole pattern that forms the same pattern as the pins 1 form on the lock plate. In addition to this, there are holes with threads 7.

There are recesses 8 on all sides of the lock housing which are perpendicular to the cover's surface 5. Opposite sides of the lock housing always have the same dimensions of the recesses 8. On these sides, there are also half as many holes 6 as there are pins 1 on the lock plate. These holes form half the interface that fit the pins 1 which are on the locking plate.

When two lock housings are assembled together with the open sides toward each other a closed geometry is formed with a pattern of holes 6 on all sides of the closed geometry. The same pattern is formed by the pins 1 which is on the lock plate.

When two lock housings are assembled, with the open sides toward each other, it forms in addition, by the recesses 8, through holes on all sides that are perpendicular to the covers 5 on the two assembled lock housings. The dimensions of the through holes correspond to the dimension of the tubes that the locking device shall be locked to.

The number of sides that are perpendicular to the cover side of the lock housing divided by two, will determine how many different tube dimensions the locking device can handle. For example, a lock housing with a cover in the form of a square, has four sides that are perpendicular to the cover and it can handle two different tube dimensions. A lock housing with a cover in the form of a hexagon, has six sides which are perpendicular to the cover and can thus handle three different tube dimensions.

Figure 2:
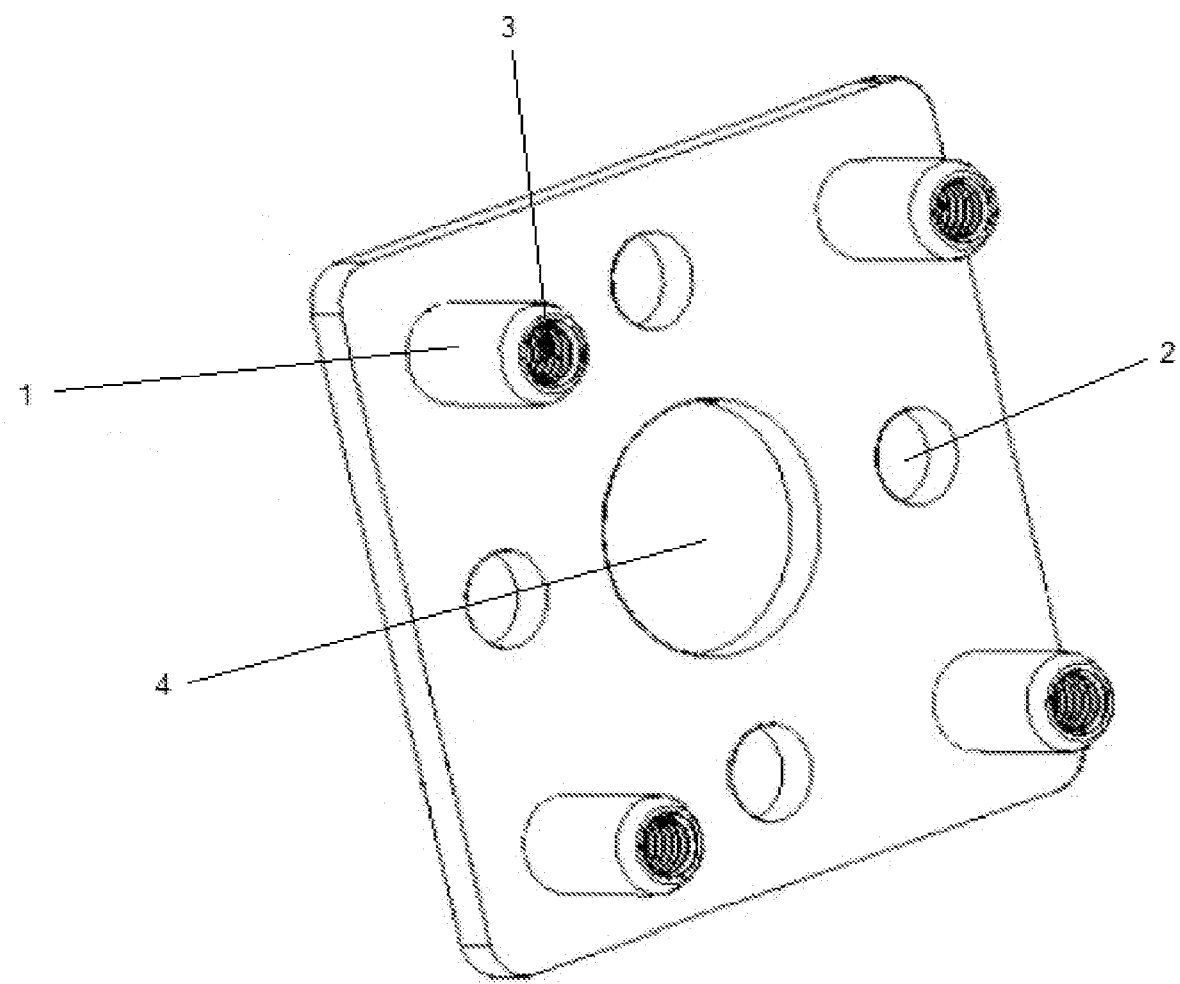
FIG. 2 shows a lock plate

FIG. 2 shows a lock plate according to an embodiment in which the plate has an interface with a number of pins 1 with internal thread 3 and a number of holes 2. Two lock plates are used to hold together two lock housings when locking. The lock plate has a hole 4 in the centre with a dimension larger than the dimension of the through half-holes in the lock housing. Accessories such as hooks, tubes, roller conveyors etc. can be connected to the lock plate, with screws through the internal threads in the pins 3.

A lock plate does not need to be flat. The important thing is that its function regarding through holes and pins, exists. The lock plate can also be integrated in an accessory.

Figure 3:
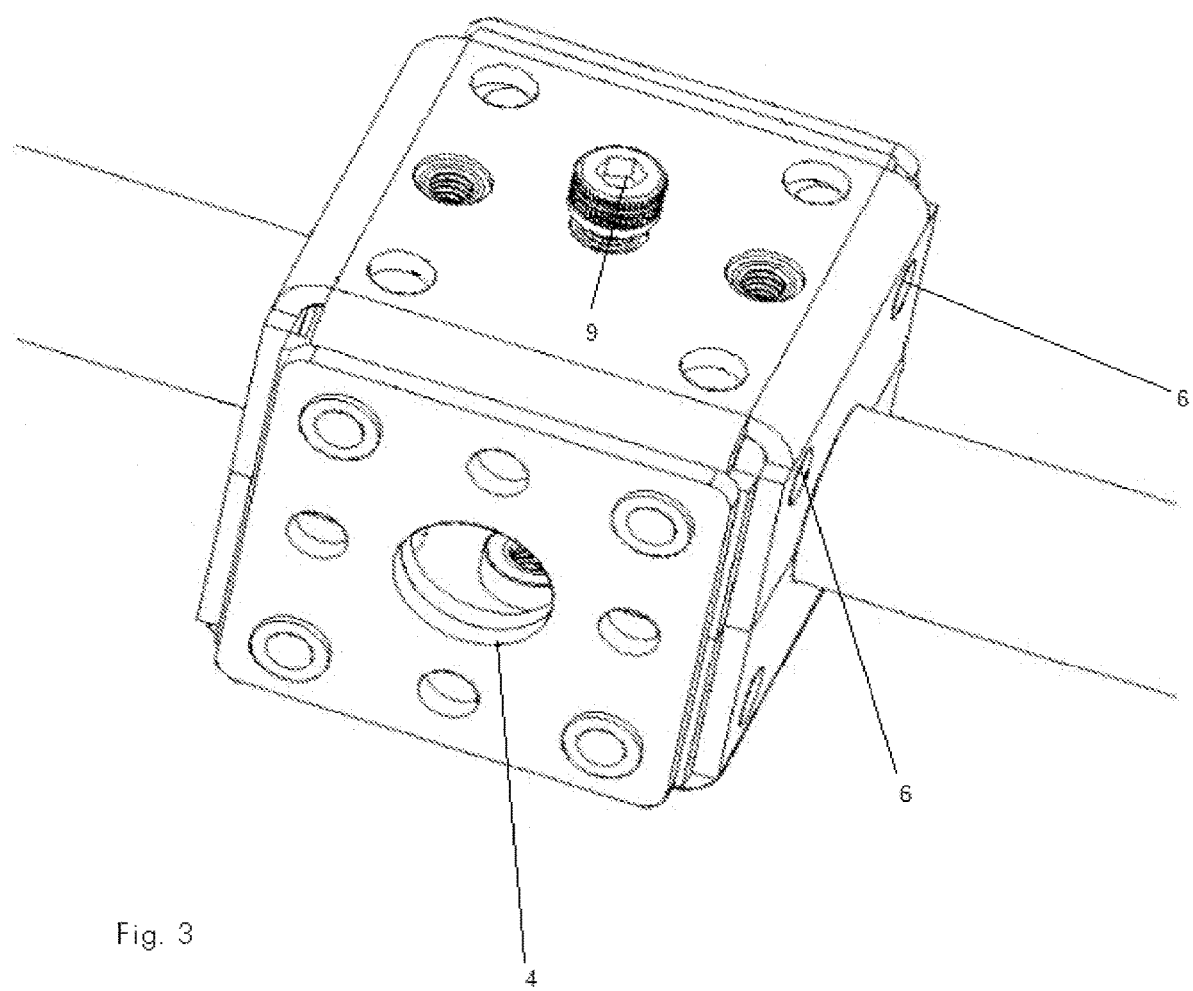
FIG. 3 shows locking device assembled on a tube

FIG. 3 shows a locking device which components can be fixed to tubes with dimensions corresponding to the dimensions of the through hole formed by the recesses 8 on the lock housing.

Assembling of a locking device on a tube is made by assembling two lock housings around a tube with the open sides toward each other. The recesses 8 on the lock housings with dimension corresponding to the tube dimension shall be oriented in the tube's axial direction. Lock plates are connected to two sides of the closed geometry that is formed when two lock housings are assembled. The lock plates are connected by fitting the pins 1 on the lock plate in the holes 6 that are on the sides of the closed geometry, which are perpendicular to the two lock housing's covers 5. Locking is done by tightening a screw 9 in the thread 7 in the middle of the cover. When tightening the screw it will press the tube against the surface of the recess 8 on the opposite lock housing, simultaneously as the lock plates hold the lock housings together. The lock plates are held in place by means of contact pressure and friction between pins 1 on the lock plate and holes 6 in the lock housing. The tube is fixed to the locking device by means of contact pressure and friction in three points, screw 9 against the tube and the two surfaces in the recesses 8 of lock housing against the tube.

When a locking device consists of two lock housings and two lock plates that are fixed to a tube, the locking device is in its basic design. In its basic design, accessories can be connected to the two sides that the lock plates are assembled to.

Figure 4:
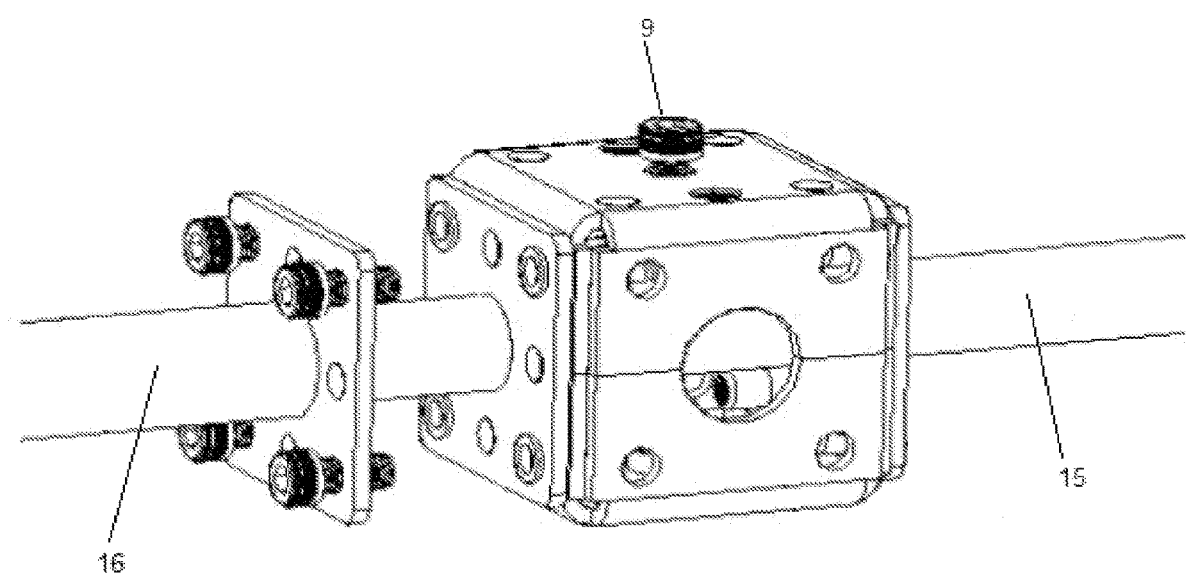
FIG. 4 shows locking device assembled on a tube including assembled accessories (tubes in telescopic connection)

FIG. 4 shows lock plates assembled on the sides of the closed geometry, formed by two lock housings, which are perpendicular to the tube's axial direction and perpendicular to the covers 5 on the closed geometry, and this may for example be used to lock two tubes of different dimensions to each other in the axial direction when using telescopic function. The inner tube 15 runs through the closed geometry and the outer tube 16 runs on the inner tube and is attached to one of the lock plates.

Figure 5:
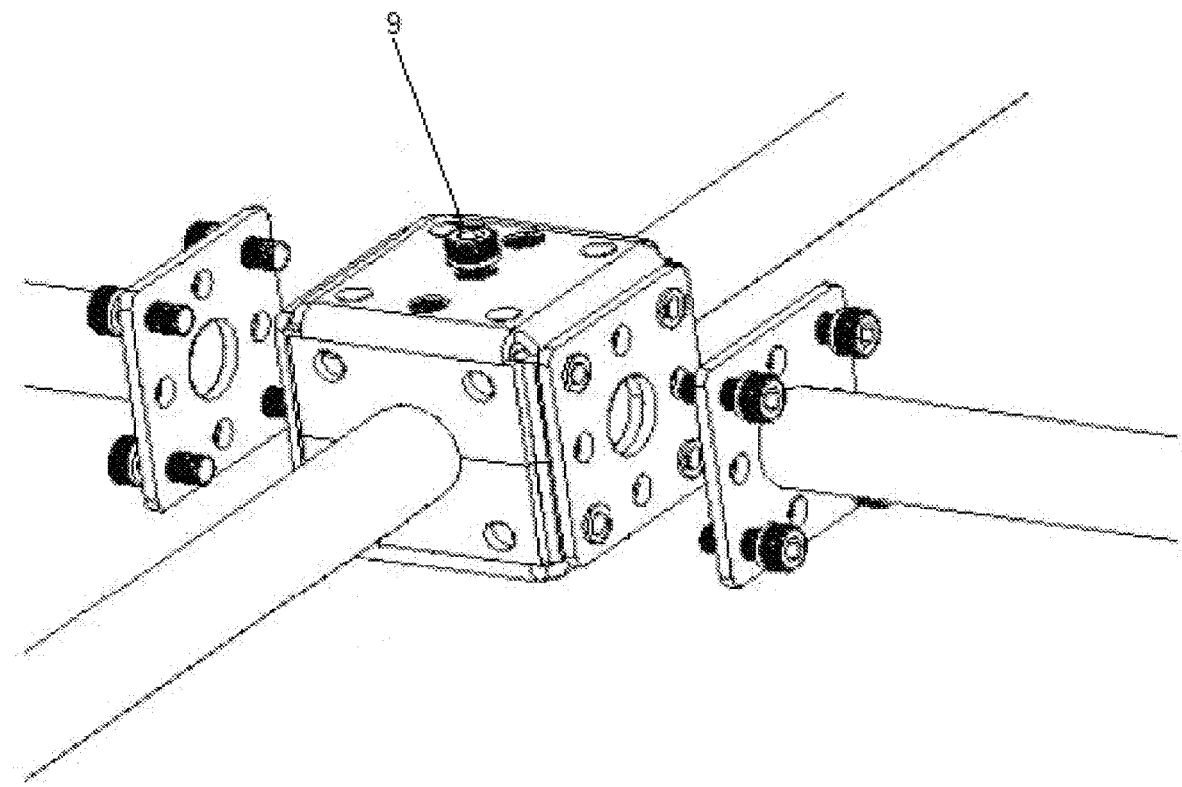
FIG. 5 shows locking device assembled on a tube including mounted accessories (tubes in x-coupling)

FIG. 5 shows that when lock plates are connected on the two sides that are parallel to the tube and perpendicular to the cover 5 in the closed geometry, a coupling in the form of a T or an X can be created, if a tube is attached to the lock plate.

Figure 6:
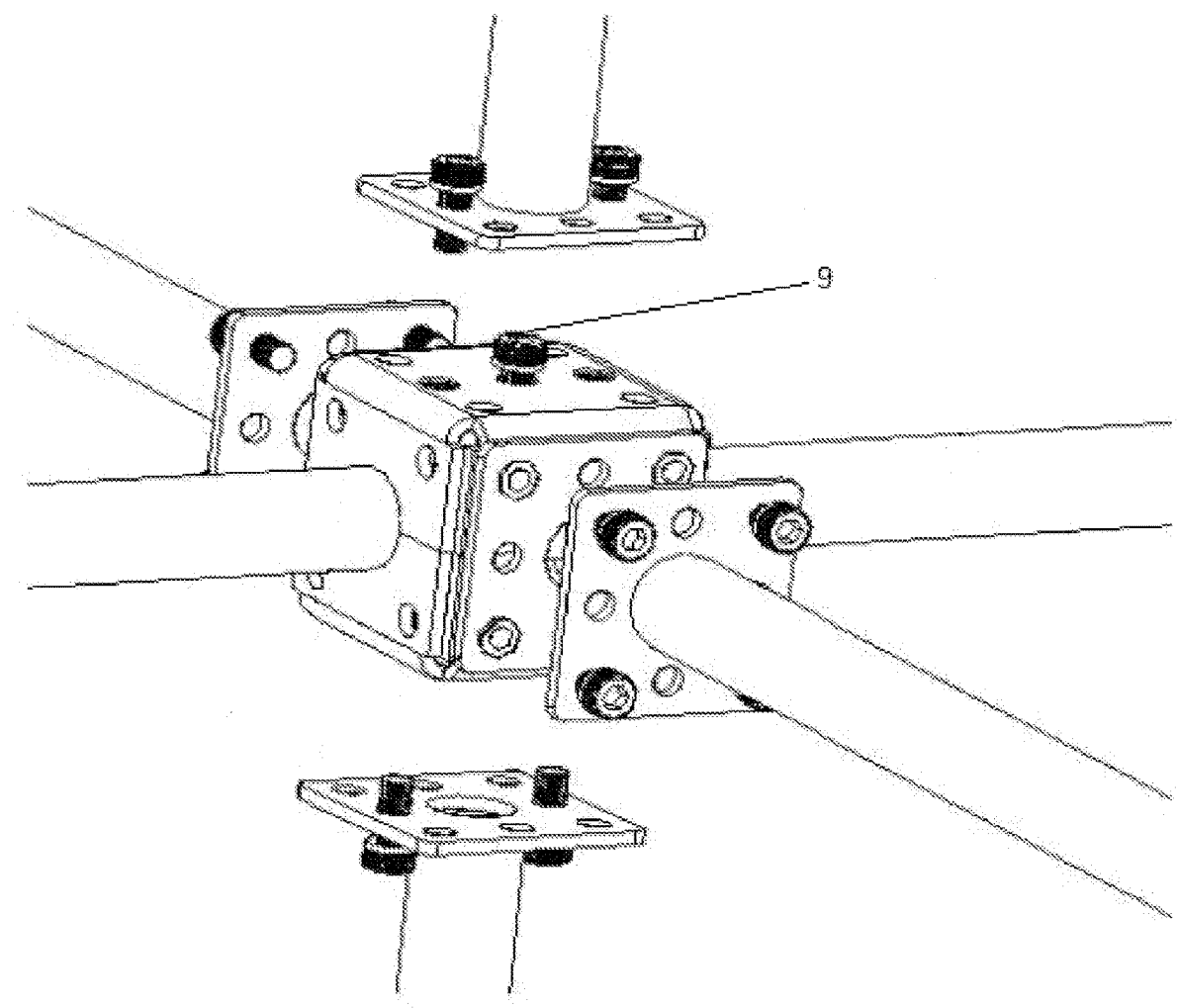
FIG. 6 shows locking device with accessories (tubes) assembled on all sides

FIG. 6 shows one embodiment where more accessories are connected through lock plates assembled to the other sides of the locking device. They could also be assembled through the thread 7 in the cover.

Figure 7:
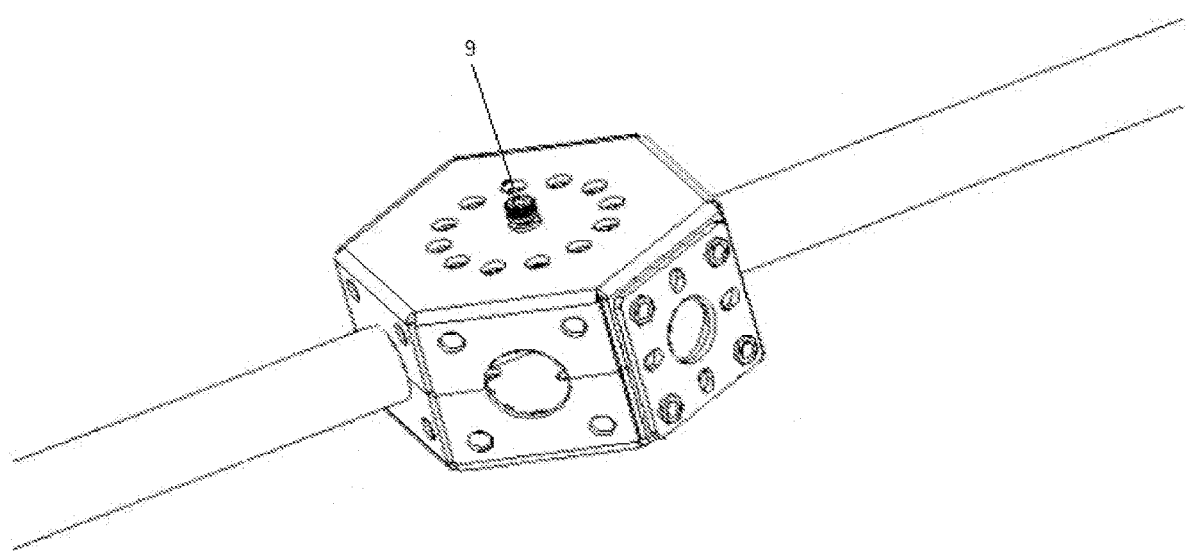
FIG. 7 shows example of a lock housing with cover in the shape of a hexagon

FIG. 7 shows an alternative geometry in which the locking device is intended to handle many different tube dimensions depending on geometry. For example, a locking device consisting of lock housings with hexagonal covers can handle three different tube dimensions.

By means of a telescopic roller conveyor different lengths of roller conveyors can be created by that the profile to which the roller organs are assembled, includes a telescopic function. The modular based design allows rebuilding of e.g. a rack very easily and enables the roller conveyor to be reused even if the dimensions of the rack are changed.

According to one embodiment, the telescopic roller conveyor includes three different modules: Inner profile, Outer profile and Connection organ with roller organs.

An inner profile and an outer profile combined with connection organ with roller organs, creates a telescopic roller conveyor.

Figure 8:
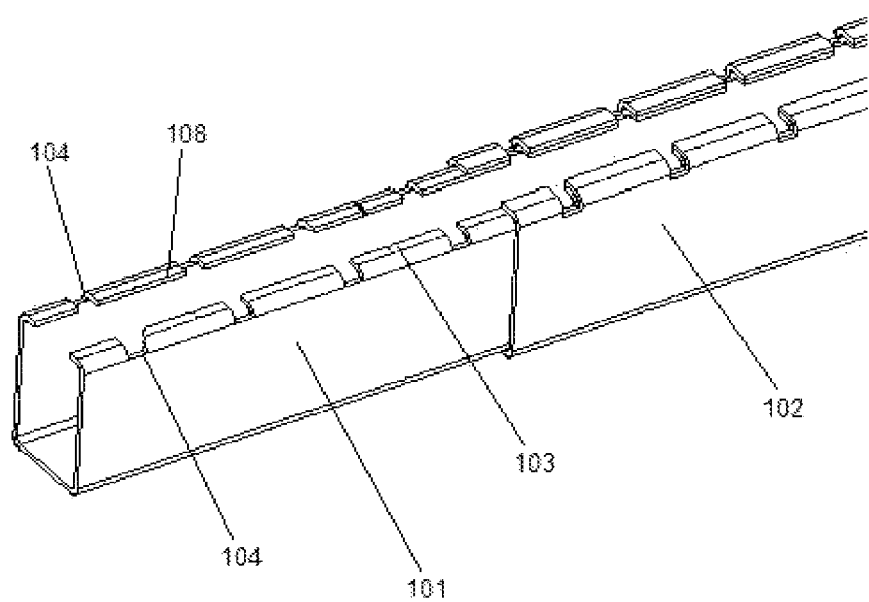
FIG. 8 shows an inner profile and an outer profile
Figure 9:
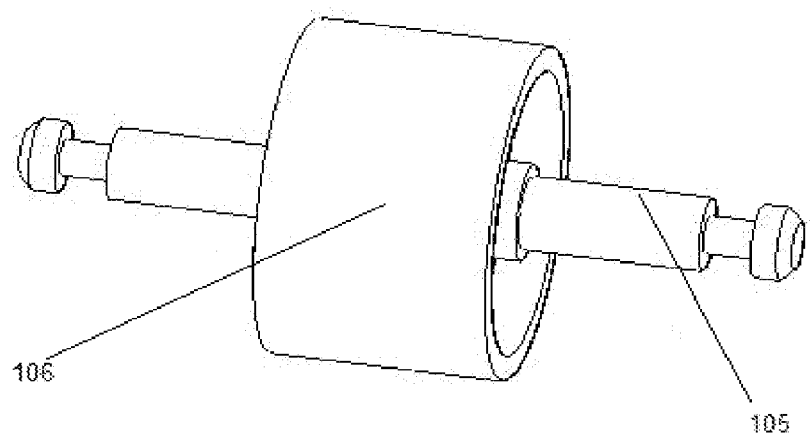
FIG. 9 shows roller organ with axle

FIG. 8 shows the inner profile 101 and the outer profile 102 according to one embodiment, in which the profiles are in the form of a C-profile. The inner profile 101 can run inside the outer profile 102, and thereby creates a telescopic function.

In alternative embodiments, the profiles 101, 102 can be in any other geometry as long as the inner profile 101 can run freely in the outer profile 102 and as long as there are recesses for axles and roller organs.

The profiles 101, 102 has a first side 103 comprising at least one first recess 108 where the width of the recess is equally wide on the inner profile 101 as on the outer profile 102. The width of the recess determines the maximum width of the rolling organs that can be assembled to the profiles.

In alternative embodiments the roller organs may comprise e.g. wheels, rollers or balls.

The first side 103 of the profiles 101, 102 comprises at least a second recess 104 intended to receive the axle 105 to which the roller organs 106 are assembled. The other recesses 104 are separated by the same distance as the distance between the roller organs' 106 center in the roller conveyor. The distance between the other recesses 104 also determines the maximum diameter of the roller organs 106 that can be assembled to the profiles.

When roller organ 106 with its axle 105 is placed in the profiles' the other recesses 104, the profiles are locked to each other in the longitudinal direction.

Figure 10:
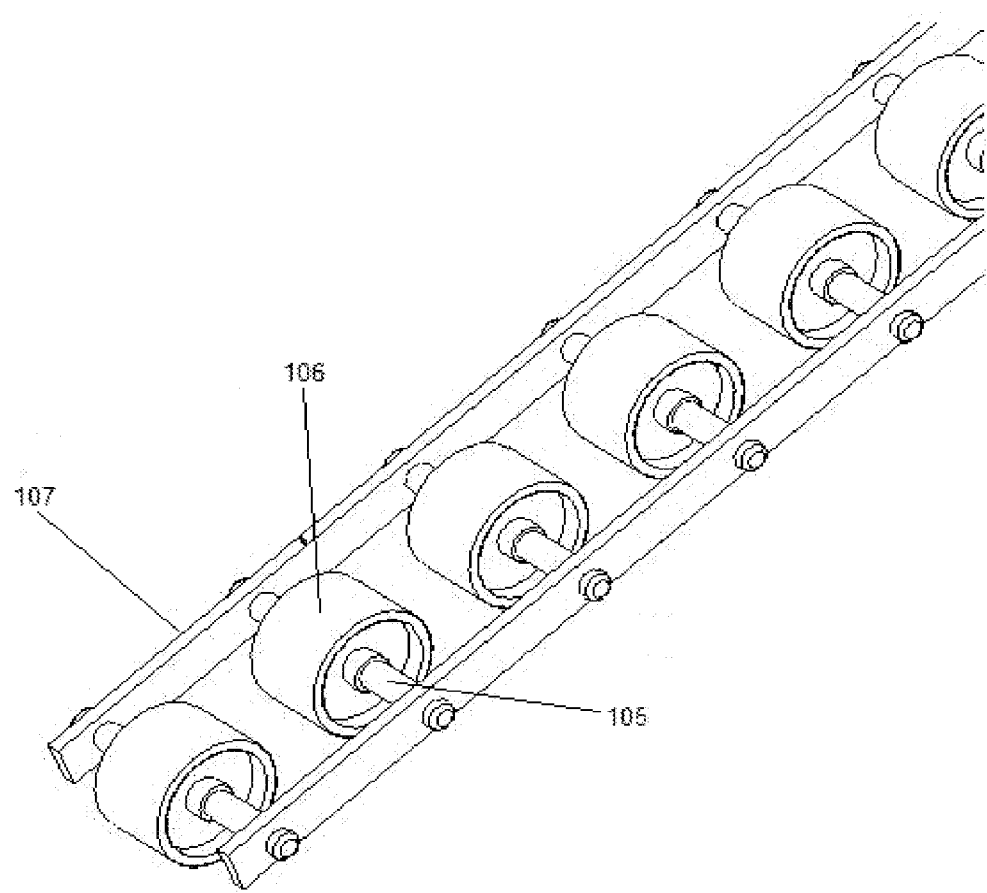
FIG. 10 shows roller organ with axle assembled to connecting organ
Figure 11:
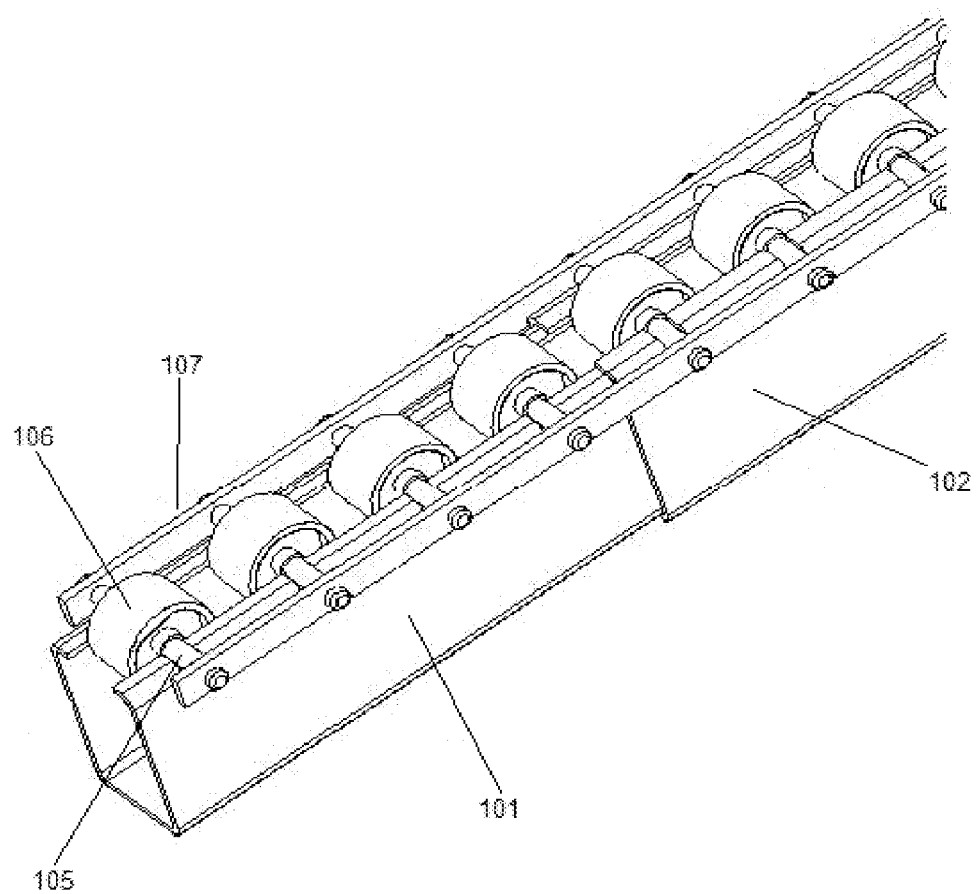
FIG. 11 shows connecting organ with roller organ assembled to the profiles

FIG. 10 shows roller organs 106 in the form of a wheel with axle 105 assembled to a connecting organ 107. Roller organ 106 with axle 105 is assembled to the connecting organs 107 with the same distance as between the other recesses 104 on the profiles. By having roller organs 106 with axle 105 assembled to a connecting organ 107, all roller organs 106 with axle 105 can be assembled or disassembled to the profiles simultaneously. Although the connecting organs have been cut in order to be adjusted for the length of the roller conveyor, it is always possible to reuse the connecting organs by placing several connecting organs 107 containing roller organs 106 and axle 105, along the length of the profiles.

The roller organs being assembled to a connecting organ 107 may e.g. refer to that they are connected with string, tape, elastic band or anything else that intends to link the wheels together with a predetermined distance from each other.

A telescoping roller conveyor is shown, characterized by that the telescopic roller conveyor includes an inner profile 101, and an outer profile 102, wherein the inner profile 101 is designed to run inside the outer profile 102 so that the telescopic function is obtained, and wherein the inner profile 101 and the outer profile 102 at a first side 103 comprises: at least a first recess 108 designed to partially contain a roller organ 106, and a second recesses 104 designed to receive an axle 105 connected to the roller organ 106, and wherein the axle 105 is designed to lock the inner profile 101 and the outer profile 102 to each other in the profiles' 101; 102 longitudinal direction.

According to one embodiment, the telescopic roller conveyor can as described above have other recesses 104 designed to partially contain a wheel assembled on the axle 105.

According to one embodiment, the telescopic roller conveyor can as described above have a first side 103 comprising a longitudinal slit 108 with a width intended to partially contain the roller organ 106.

According to one embodiment, the telescopic roller conveyor can include at least two axles 105, each one connected to roller organs 106 as described above, wherein the axles 105 include a first and second end, and wherein at least one of the first or the second ends are assembled to a connecting organ 107 at the same distance as the recesses 104 in the inner profile 101 and the outer profile 102, so that at least two axles 105 and roller organs 106 on the roller conveyor's length can be assembled and disassembled to the profiles 101; 102 simultaneously.

Further, the invention includes a material rack comprising telescoping roller conveyor as described above.

The abovementioned description of embodiments shall not be understood as limiting, but can be freely combined within the scope of the claims.

The invention claimed is:

1. A lock housing adapted to be fixated to an elongated element, the lock housing comprising:
 a first side having at least three holes, where at least one hole comprises threads and is positioned on the first side and adapted to receive a screw; and
 second and third sides substantially perpendicular to the first side, wherein:
  the second and third sides each comprise a recess with an opening along its periphery, said recess being adapted to receive the elongated element; the second and third sides are opposite to each other and the recesses have substantially the same dimension and shape such that the elongated element is permitted to move through the lock housing,
  the second and third sides each comprise at least two through holes adapted to be connected to corresponding holes or protrusions on a lock plate, and
  a direction of the at least two through holes is perpendicular to a direction of the at least one hole comprising threads
 wherein the lock housing is configured to be assembled with a second identical lock housing such that the openings along the periphery of the recesses of the second and third sides of the lock housing are placed opposite to the openings along the periphery of the recesses of the second and third sides of the second lock housing to form a geometry,
 wherein said geometry, once assembled, will have through holes formed by the recesses in the lock housings,
 wherein said through holes correspond to a geometry of the elongated element, and
 wherein the at least one hole comprising threads is positioned such that a screw placeable in the at least one hole comprising threads can engage the elongated element when placed in the through holes formed by the recesses.

2. The lock housing according to claim 1, wherein the lock housing comprises four other sides substantially perpendicular to the first side.

3. The lock housing according to claim 2, wherein the lock housing has the form of half a cube.

4. The lock housing according to claim 1, wherein the at least two through holes of a first other side, of the second and third sides, are aligned with the at least two through holes of a second other side, of second and third sides.

5. A locking device adapted for fixation to an elongated element, the locking device comprising a first and a second lock housing, wherein each lock housing comprises:
 a first side having at least three holes, where at least one hole comprises threads and is positioned on the first side and adapted to receive a screw; and
 second and third sides perpendicular to the first side, wherein:
  the second and third sides each comprise a recess with an opening along its periphery, said recess being adapted to receive the elongated element;
  the second and third sides are opposite to each other and the recesses have substantially the same dimension and shape such that the elongated element is permitted to move through the lock housing, the second and third sides each comprise at least two through holes adapted to be connected to corresponding holes or protrusions on a lock plate, and a direction of the at least two through holes is perpendicular to a direction of the at least one hole comprising threads, wherein the first lock housing is configured to be assembled with the second lock housing such that the openings along the periphery of the recesses of the second and third sides of the first lock housing are placed opposite to the openings along the periphery of the recesses of the second and third sides of the second lock housing to form a geometry, wherein said geometry, once assembled, will have through holes formed by the recesses in the first and second lock housings, wherein said through holes correspond to a geometry of the elongated element, and wherein the at least one hole comprising threads is positioned such that a screw placeable in the at least one hole comprising threads can engage the elongated element when placed in the through holes formed by the recesses, and wherein the locking device further comprises a first and second lock plate, each lock plate comprising at least two features for connecting the first and second lock housings, wherein each feature comprises at least one of a hole and a protrusion.

6. The locking device according to claim 5, wherein at least one of the first and second lock plates comprises at least one protrusion having a through hole with internal threads to connect one or more accessories to the locking device.

7. A material rack comprising:
a) an elongated element; and
b) the locking device of claim 5 fixed to the elongated element.

8. The material rack of claim 7, wherein at least one of the first and second lock plates comprises at least one protrusion having a through hole with internal threads to connect one or more accessories to the locking device.

9. A method for connecting tubes using the locking device according to claim 5, the method comprising the steps of:
a) assembling the first and second lock housings around a tube;
b) connecting the first and second lock plates to the first and second lock housings by connecting the at least two features of each lock plate with the at least two through holes of the second and third sides of the first and second lock housings; and
c) locking the locking device to the tube by tightening a screw placed in the threaded hole of at least one of the first and second lock housings.

10. The method of claim 9, wherein at least one of the first and second lock plates comprises at least one protrusion having a through hole with internal threads to connect one or more accessories to the locking device.

* * * * *